US006379465B1

(12) United States Patent
Perkins et al.

(10) Patent No.: US 6,379,465 B1
(45) Date of Patent: Apr. 30, 2002

(54) COATING SYSTEM WITH CENTRALIZED CONTROL PANEL AND GUN MAPPING

(75) Inventors: Jeffrey A. Perkins, Amherst; Charles L. Gatian, III, North Ridgeville; Joseph G. Schroeder, North Royalton, all of OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 09/563,563

(22) Filed: May 3, 2000

Related U.S. Application Data

(60) Provisional application No. 60/154,492, filed on Sep. 17, 1999.

(51) Int. Cl.[7] .......................... B05C 11/00; B05B 7/00; G05B 11/01

(52) U.S. Cl. ...................... 118/695; 118/698; 118/308; 700/17

(58) Field of Search ................................ 118/663, 698, 118/669, 688, 695, 308; 700/17, 83, 179, 180, 241, 240, 169, 248, 283, 247

(56) References Cited

U.S. PATENT DOCUMENTS 5,443,642 A * 8/1995 Bienduga .................... 118/688
5,566,042 A 10/1996 Perkins et al.
5,725,161 A 3/1998 Hartle
5,725,670 A 3/1998 Wilson et al.
5,743,958 A 4/1998 Shutic
5,788,728 A 8/1998 Solis et al.
5,816,508 A 10/1998 Hollstein et al.
5,843,515 A * 12/1998 Crum et al. ................... 427/8
5,847,945 A 12/1998 Burtin et al.
5,904,294 A 5/1999 Knobbe et al.
5,908,162 A 6/1999 Klein et al.
5,938,126 A 8/1999 Rehman et al.
6,112,999 A * 9/2000 Fingleton et al. .............. 239/8

OTHER PUBLICATIONS

Sure Coat® Rack Mount Automatic Controller—Customer Product Manuel Part 303 818 A.

* cited by examiner

*Primary Examiner*—Richard Crispino
*Assistant Examiner*—Yewebdar T Tadesse
(74) *Attorney, Agent, or Firm*—Calfee, Halter & Griswold LLP; Nenad Pejic; Edmund J. Wasp

(57) ABSTRACT

Systems and methods for controlling, organizing, and viewing a plurality of electrostatic spray gun operating parameters from a centralized control panel are provided. In this regard, a control panel is provided having, for example, a gun control area for selecting one electrostatic spray gun of a multiple gun system, and an electrostatic control area for displaying and controlling the operational parameters of the selected electrostatic spray gun. The electrostatic control area functions essentially as a master control panel which can be shared by all the guns in the system. Each of the guns has an assigned gun control subpanel in the gun control area. Each subpanel includes a selector switch which can be used to monitor and control the gun associated with that subpanel on the master control panel. Each of the subpanels also has a limited display such as a bar graph which can be used to show the electrostatic performance of the guns. The subpanel displays are configured in a tight cluster so that the operator can easily simultaneously monitor the performance of all the guns in the system to identify any guns which are not performing properly. A method for mapping a physical arrangement of electrostatic spray guns onto a gun control area of an operator control panel is also provided.

12 Claims, 15 Drawing Sheets

FIG. 7B

704

| Physical Table | |
|---|---|
| Physical Index | Logical Assign. |
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |

FIG. 8B

804

| Physical Table | |
|---|---|
| Physical Index | Logical Assign. |
| 0 | 0 |
| 1 | 8 |
| 2 | 1 |
| 3 | 9 |
| 4 | 2 |
| 5 | 10 |
| 6 | 3 |
| 7 | 11 |
| 8 | 4 |
| 9 | 12 |
| 10 | 5 |
| 11 | 13 |
| 12 | 6 |
| 13 | 14 |
| 14 | 7 |
| 15 | 15 |

| Logical Table | |
|---|---|
| Logical Index | Physical Index |
| 0 | 0 |
| 1 | 2 |
| 2 | 4 |
| 3 | 6 |
| 4 | 8 |
| 5 | 10 |
| 6 | 12 |
| 7 | 14 |

| Logical Table | |
|---|---|
| Logical Index | Physical Index |
| 8 | 1 |
| 9 | 3 |
| 10 | 5 |
| 11 | 7 |
| 12 | 9 |
| 13 | 11 |
| 14 | 13 |
| 15 | 15 |

902

| Logical Table | |
|---|---|
| Logical Index | Physical Assign. |
| 0 | 0 |
| 1 | 1 |
| 2 | 2 |
| 3 | 3 |
| 4 | 16 |
| 5 | 16 |
| 6 | 16 |
| 7 | 16 |

902

| Logical Table | |
|---|---|
| Logical Index | Physical Assign. |
| 8 | 4 |
| 9 | 5 |
| 10 | 6 |
| 11 | 7 |
| 12 | 16 |
| 13 | 16 |
| 14 | 16 |
| 15 | 16 |

FIG. 9B

904

| Physical Table | |
|---|---|
| Physical Index | Logical Assign. |
| 0 | 0 |
| 1 | 1 |
| 2 | 2 |
| 3 | 3 |
| 4 | 8 |
| 5 | 9 |
| 6 | 10 |
| 7 | 11 |
| 8 | 16 |
| 9 | 16 |
| 10 | 16 |
| 11 | 16 |
| 12 | 16 |
| 13 | 16 |
| 14 | 16 |
| 15 | 16 |

FIG. 10B

1004

| Physical Table | |
|---|---|
| Physical Index | Logical Assign. |
| 0 | 8 |
| 1 | 1 |
| 2 | 2 |
| 3 | 3 |
| 4 | 4 |
| 5 | 5 |
| 6 | 6 |
| 7 | 7 |
| 8 | 16 |
| 9 | 9 |
| 10 | 10 |
| 11 | 11 |
| 12 | 12 |
| 13 | 13 |
| 14 | 14 |
| 15 | 15 |

1002

| Logical Table | |
|---|---|
| Logical Index | Physical Index |
| 0 | 16 |
| 1 | 1 |
| 2 | 2 |
| 3 | 3 |
| 4 | 4 |
| 5 | 5 |
| 6 | 6 |
| 7 | 7 |

1002

| Logical Table | |
|---|---|
| Logical Index | Physical Index |
| 8 | 0 |
| 9 | 9 |
| 10 | 10 |
| 11 | 11 |
| 12 | 12 |
| 13 | 13 |
| 14 | 14 |
| 15 | 15 |

COATING SYSTEM WITH CENTRALIZED CONTROL PANEL AND GUN MAPPING

This application claims priority to U.S. Provisional Patent Application No. 60/154,492 filed Sep. 17, 1999, the entire disclosure of which is hereby incorporated by reference herein.

FIELD OF THE INVENTION

The invention relates generally to electrostatic spray systems, and more particularly, to the control and monitoring of a plurality of electrostatic spray gun operating parameters from a centralized control panel.

BACKGROUND OF THE INVENTION

Electrostatic spray systems apply powder paints and coatings to a variety of products including, for example, appliances, automotive components, metal office furniture/storage shelving, electrical transformers, and recreational equipment. A critical component of such spray systems is a spray gun and a spray gun controller. The spray gun and the spray gun controller are responsible for generating a corona-charging effect that is the basis of electrostatic spray systems.

In corona-charging systems, an electric field is created between a spray gun and a part to be painted by applying a high (usually negative) voltage potential to a pointed electrode located on the tip of the spray gun. Powder is sprayed through the area of the electric field. Passing through this area, the powder particles are charged and are drawn to the usually grounded part to be painted. In this manner, the part to be painted is coated with powder paint.

Electrostatic spray systems often include a plurality of electrostatic spray guns. The control and operation of a plurality of electrostatic spray guns can become complex for the operator on the production floor. Normally each electrostatic spray gun has its own controller. The controller is normally a box containing electrical components. The face of the box is typically the control panel for the gun. The control panel generally includes controls such as knobs, switches and buttons for setting the operating parameters for the power supply for the spray gun, and the pump which supplies powder to the spray gun. In addition, typically a display is provided as part of the control panel adjacent to the controls to display the various settings for the gun and parameters of gun operation. In systems having twenty spray guns, for example, a rack of twenty such controller boxes must be provided close to the spray booth. These control boxes would be stacked in, for example, two adjacent stacks of ten boxes. The operator who is running this powder coating system has therefore been required to individually adjust the operating parameters for each of the spray guns at the control panel for that gun. This has required him to reach above eye level to adjust the control panels at the top of the stack, and bend over, or squat low to the floor, to reach the control panels close to floor level. Consequently, he must do a fairly repetitive operation at each control panel while moving up and down the stacks from control panel to control panel, sometimes in positions which are uncomfortable and potentially prone to promote operator error. Moreover, when viewing the displays for the guns, the operator must look at the twenty different displays spaced side by side from close to floor level to approximate six feet above floor level. This is to large and confusing an area to effectively view all at once for an operator who is trying to compare the operation of the guns in the system from one gun to the next.

Therefore, it is highly desirable to provide a system and method for conveniently controlling, setting and monitoring a plurality of electrostatic spray gun operating parameters in a powder coating system from a single location.

SUMMARY OF THE INVENTION

To improve upon these prior art powder spray gun control systems, one aspect of the present invention is to permit the monitoring control of many of the gun control functions on a single master control panel which could be used for all the guns in the system. More specifically, the invention permits all the parameters associated with the gun's electrostatics to be monitored and controlled using a single master control panel. That leaves only the pneumatic functions to be performed by the individual control panel for each gun. This in turn permits the size of the individual control panel for each gun to be greatly reduced reducing the overall size of the coating system controller. This single master control panel is ideally located at a convenient and comfortable position for the operator to monitor and operate the control panel, preferably at approximately eye level. In addition, by reducing the functions of the individual gun control panels, it is also possible to provide a more limited gun operation display for each gun in a relatively small cluster of such displays. This permits the guns to be conveniently viewed as a group, without a lot of clutter between the various displays. In this way, the individual gun displays can be conveniently viewed as a group to spot any guns that are not performing properly.

Thus, according to one embodiment of the present invention, an operator control panel for controlling the operation of one or more electrostatic spray guns is provided. The panel includes, for example, a gun control area for selecting one or more of the electrostatic spray guns to be active, an electrostatic control area for displaying and controlling the operational parameters of the one or more selected electrostatic spray guns, a manual trigger area for allowing the manual triggering of the one or more selected electrostatic spray guns, and a system functions area for controlling the pneumatic operation of the one or more selected electrostatic spray guns.

According to another embodiment of the present invention, a system for controlling one or more electrostatic spray guns is also provided. The system includes, for example, an input/output port for placing the one or more electrostatic spray guns in electric circuit communication with the system, a central processing unit in electric circuit communication with the input/output port and for executing commands associated with the control of the one or more electrostatic spray guns, and an operator control panel in electric circuit communication with the central processing unit. The operator control panel preferably includes, for example, a gun control area for selecting one or more of the electrostatic spray guns to be active; an electrostatic control area for displaying and controlling the operational parameters of the one or more selected electrostatic spray guns, a manual trigger area for allowing the manual triggering of the one or more selected electrostatic spray guns, and a system functions area for controlling the pneumatic operation of the one or more selected electrostatic spray guns.

According to yet another embodiment of the present invention, a method of mapping a physical arrangement of electrostatic spray guns onto a gun control area of an operator control panel is provided. The method includes, for example, the steps of: detecting whether an electrostatic spray gun is connected to an input/output card associated with the operator control panel; and if an electrostatic spray gun is detected, assigning to the gun a gun control from the gun control area. In this manner, for operator convenience, the gun controls of the gun control area can mirror the physical configuration of the electrostatic spray guns in the coating booth.

It is, therefore, an advantage of the present invention to provide a system and method that allows for the convenient observation of multiple electrostatic spray gun parameters from a single location.

It is a further advantage of this invention to provide a system and method that permits the operator to conveniently control multiple electrostatic spray guns from a single location.

It is a further advantage of this invention to minimize the size of the individual controller units required to control multiple guns in an electrostatic spray booth by providing a single, or master, operator control panel for preferably controlling and monitoring all the electrostatic parameters of the guns.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve as examples of principles of this invention.

FIGS. 7B, 8B, 9B, and 10B illustrate physical-to-logical tables based on the configurations shown in FIGS. 7A, 8A, 9A, and 10A, respectively

DETAILED DESCRIPTION OF ILLUSTRATED EMBODIMENT

Figure 1:
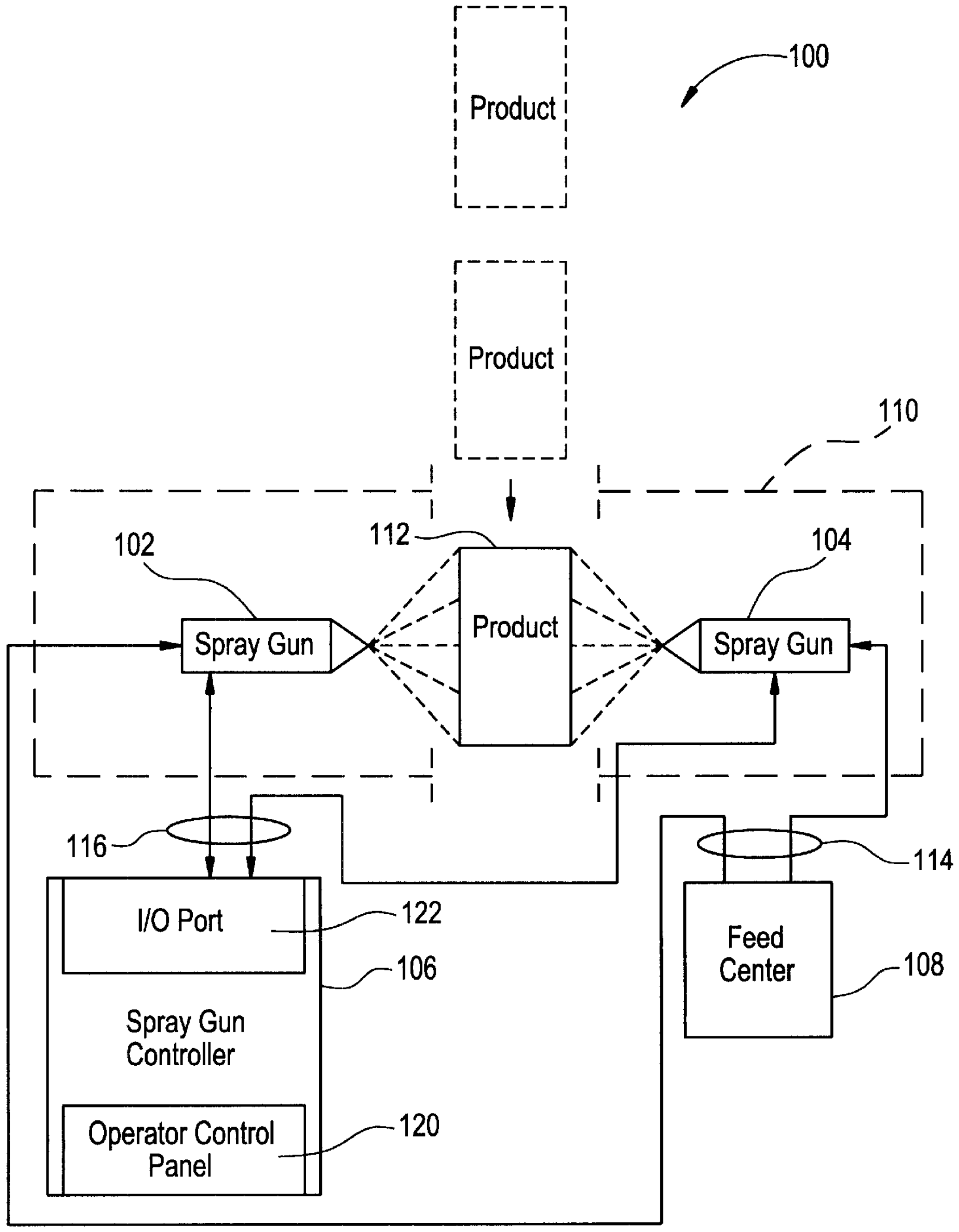
FIG. 1 is a block diagram of an electrostatic spray system of the present invention.

Referring now to FIG. 1, an overview of an electrostatic spray system 100 is shown. The electrostatic spray system 100 generally includes, for example, one or more spray guns 102 and 104 that are in electric circuit communication with a spray gun controller 106. The circuit communication is preferably via shielded and insulated wire conductors. The one or more spray guns 102 and 104 are also in fluid communication with a feed center 108. The fluid communication is via one or more hoses. Products or parts 112 to be sprayed or coated enter the electrostatic spray system 100 through an opening in a booth 110. In booth 110, the product 112 is sprayed by spray guns 102 and/or 104. The spray guns 102 and/or 104 are controlled by spray gun controller 106. Other components (not shown) such as, for example, a compressed air source and electric power sources, are typically also part of electrostatic spray system 100. More detailed examples of electrostatic spray systems are described in U.S. Pat. No. 5,788,728 to Solis, U.S. Pat. No. 5,743,958 to Shutic, U.S. Pat. No. 5,725,670 to Wilson et al., U.S. Pat. No. 5,725,161 to Hartle, which are hereby incorporated by reference.

The electrostatic application of powder coating to the product 112 begins with fluidization. Fluidization is a process where powder being sprayed mixes with compressed air, enabling it to be pumped from a container in the feed center 108 and supplied to the spray guns 102 and/or 104. The powder flow is regulated by controlling the air supplied to the powder pumps in the feed center which feed spray guns 102 and/or 104. Spray guns 102 and/or 104 can be liquid coating applicators or corona or tribo-charging powder spray guns. Whereas the invention is described with respect to a powder coating system it is equally applicable to a liquid coating system. Powder is sprayed from the guns towards grounded part 112. When the powder particles come close to the product 112, an electrostatic attraction between the charged powder particles and the grounded product 112 causes the powder to stick to the product 112. The coated product 112 is then conveyed through an oven (not shown) and is cured. Any oversprayed powder that does not adhere to the part 112 is contained within the booth 110 and drawn into a collection system by a fan (not shown). The recovered powder is then sieved and supplied back to the spray guns 102 and/or 104.

The spray gun 102 performs several functions including, for example, controlling the size and shape of powder spray pattern, and imparting an electrostatic charge to the powder being sprayed. Electrostatic spray system 100 is shown with two spray guns 102 and 104 for exemplary purposes only. Alternative embodiments of electrostatic spray system 100 can include one or more spray guns and the invention especially useful for systems having many spray guns. Hence, reference hereinafter will be made only to spray gun 102 with the understanding that such reference applies to any number of spray guns that may be present in the electrostatic spray system 100.

The powder spray gun 102 is preferably one of two types: corona charging or tribo-charging. High voltage or low voltage cables 116 are the two preferred ways that the power source is applied to the tip of a corona-charging powder spray gun. The type of cable depends on whether the high voltage power supply of the power source is external or internal to the spray gun. The charging power supplies are generally rated from 30,000 to 100,000 volts.

The word tribo is derived from the Greek word tribune, meaning to rub or produce friction. In tribo charging, the powder particles are charged by causing them to rub at a high velocity on a charging surface inside the gun and thereby, transfer charge from the charging surface to the powder particles. Thus, tribo guns have no internal or external power supplies. They do however have a ground line which runs from the gun through an ammeter to ground. The ammeter reading is used to evaluate the performance of the gun.

The powder spray gun 102 can also be either manual or automatic. Manual spray guns are held and triggered by a hand painter. Examples of manual spray gun systems include the SURE COAT® Manual Spray Gun System, TRIBOMATIC® II Spray Gun, TRIBOMATIC® 500

Manual Spray Gun, TRIBOMATIC® Wand, and the TRIBOMATIC® Disc, all manufactured by Nordson Corp. of Westlake, Ohio. Automatic spray guns may be fixed, or mounted on gun movers, and are triggered by a controller. Examples of automatic spray gun systems include the VERSA-SPRAY® II Automatic Spray System and the VERSA-SPRAY® II PE Porcelain Enamel Spray System with SURE COAT® Control, all manufactured by Nordson Corp. of Westlake, Ohio. Examples of various spray guns suitable to the present invention are described in U.S. Pat. No. 5,938,126 to Rehman et al., U.S. Pat. No. 5,908,162 to Klein et al., U.S. Pat. No. 5,904,294 to Knobbe et al., U.S. Pat. No. 5,816,508 to Hollstein et al., U.S. Pat. No. 5,725,161 to Hartle, and are hereby incorporated by reference. In addition to the above-cited examples, the present invention is applicable to any type of spray gun utilizing corona or tribo charging.

Still referring to FIG. 1, the spray gun controller 106 has an operator control panel 120 and an I/O port 122. As will be described, the operator control panel 120 allows an operator to track the operation of multiple spray guns and to conveniently control their operation from a centralized location. The I/O port 122 provides an electrical interface between the operator control panel 120 and the spray guns 102 and/or 104. In alternative embodiments, the I/O port 122 is integrated into the operator control panel 120.

Figure 2:
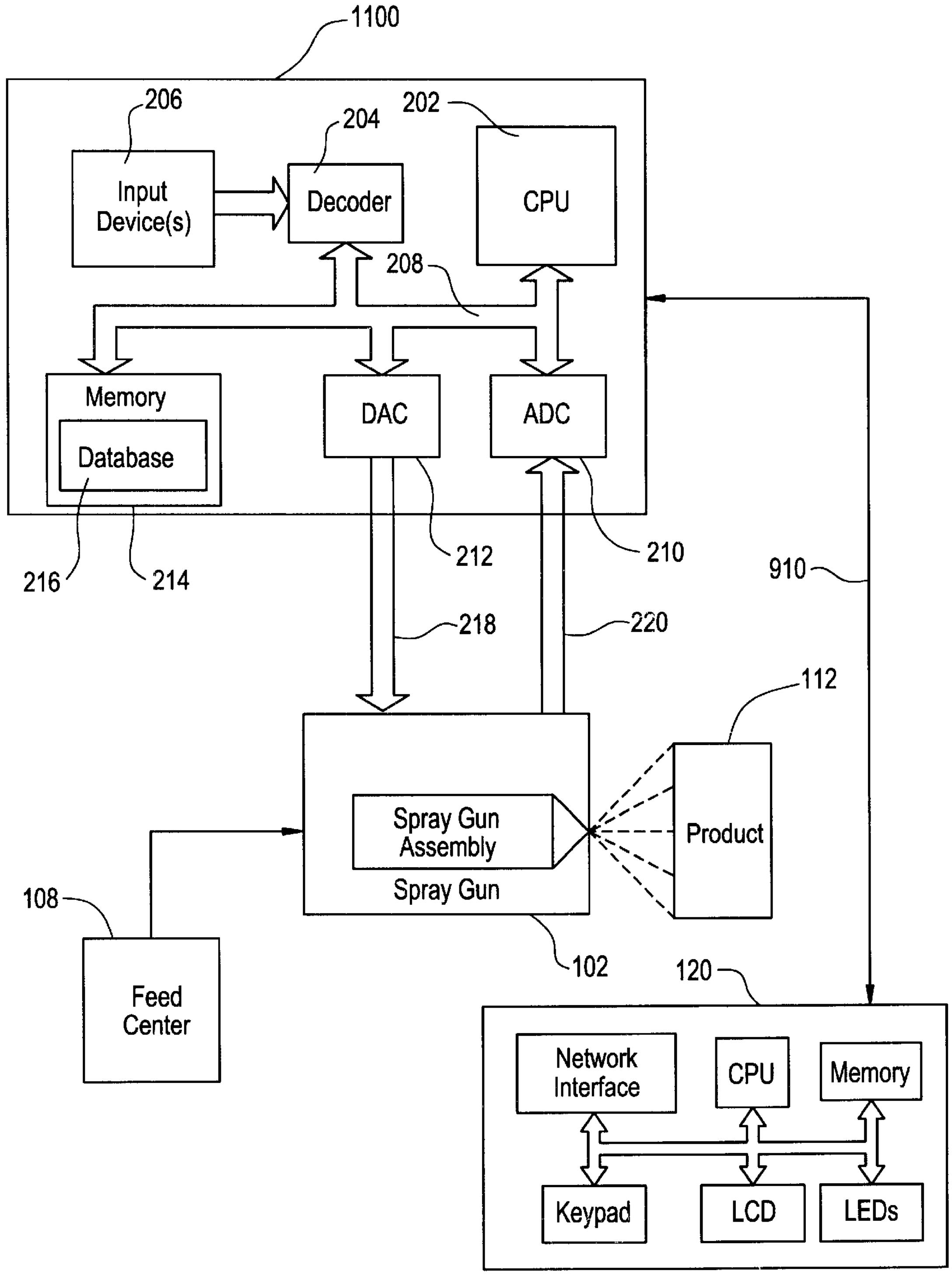
FIG. 2 is block diagram of a spray gun controller of the present invention.
Figure 11:
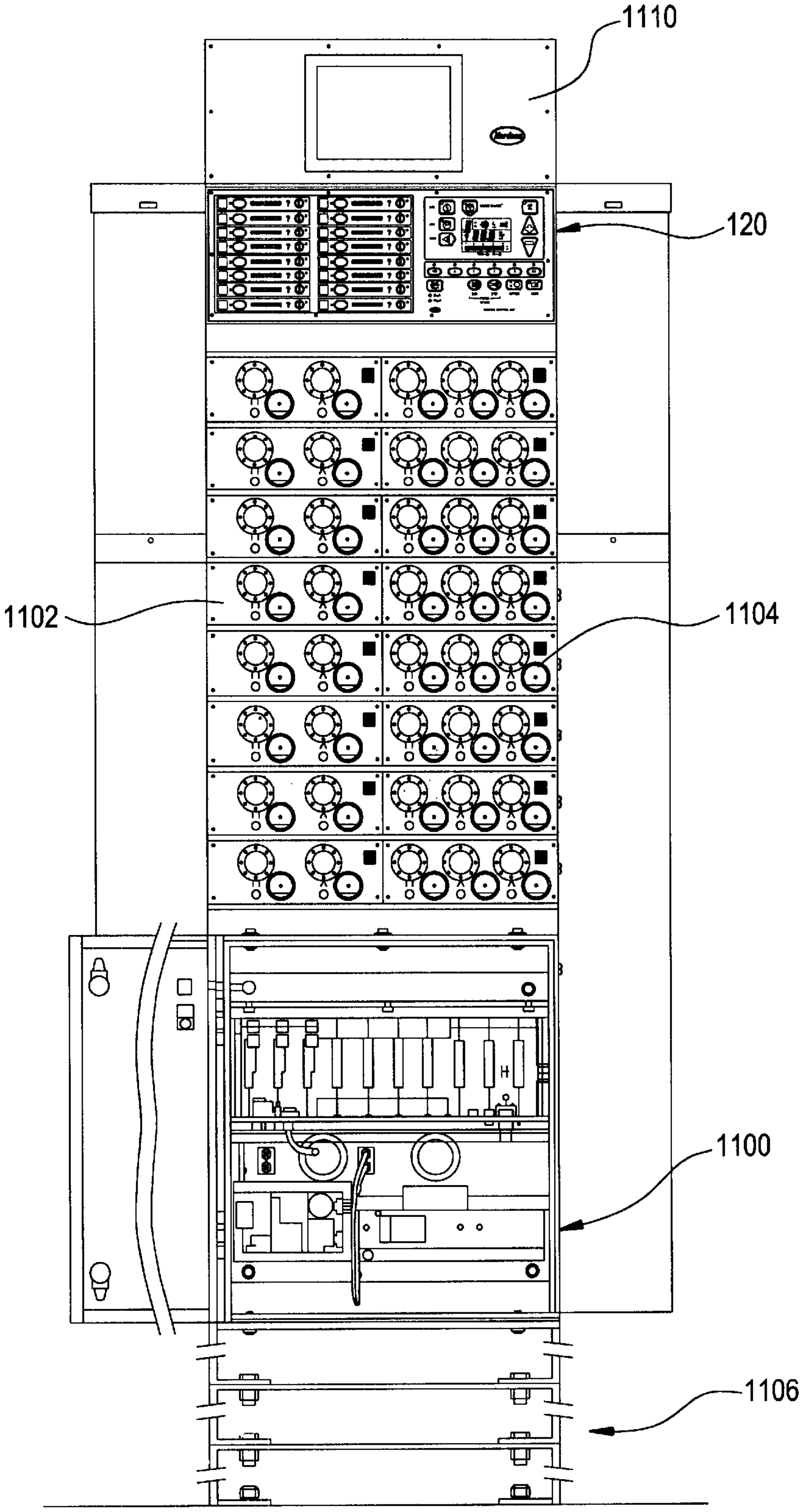
FIG. 11 is a front elevational view of one embodiment of the controller used in the present invention.

FIG. 2 together with FIG. 11 show the spray gun controller 106 of FIG. 1 split into a plurality of components, which would be housed within a power cabinet 1100 on base 1106 of the controller unit, and those components which would be housed in the operator control panel 120. The base 1106 is adjustable in height through the addition or deletion of base stack components that are preferably bolted together. Operator control panel 120 preferably includes a network interface, CPU, memory, keypad, LCD and LEDs all communicating through an information bus. The components of operator control panel 120 are preferably connected through a twisted-pair serial bus to the components housed within power cabinet 1100.

Power cabinet 1100 preferably includes a central processing unit (CPU) 202, decoder 204, input device(s) 206, analog-to-digital converter (ADC) 210, digital-to-analog converter (DAC) 212, and memory 214. These components are all interconnected as shown in FIG. 2 via bus 208.

The decoder 204 decodes information input from the input devices 206 and places such information on bus 208. The ADC 210 converts analog information received from spray gun 102 on analog databus 220 to digital information and makes such digital information available on bus 208. The analog information received from the spray gun 102 includes the gun's operating parameters such as, for example, the feedback current from the spray gun 102. In some instances, ADC 210 and analog data bus 220 may be in electric circuit communication with gun 102 through appropriate buffering and interface devices (not shown).

The DAC 212 converts digital information from the operator control panel 120 to analog information suitable for input to the spray gun 102 through analog data bus 218. In some cases, DAC 212 and analog data bus 218 may be in electric circuit communication with spray gun 102 indirectly via appropriate buffering components (not shown). The analog information transmitted on data bus 218 preferably includes, for example, a drive current signal that is input to the power supply of spray gun 102.

Memory 214 preferably includes the operating logic and any database information that is necessary to operate the one or more spray guns. Such database information can include, for example, the type of spray gun, power supply drive voltage information, power supply drive current information, and possibly triggering information. This list is not meant to be exhaustive and can include other information as well.

Figure 3:
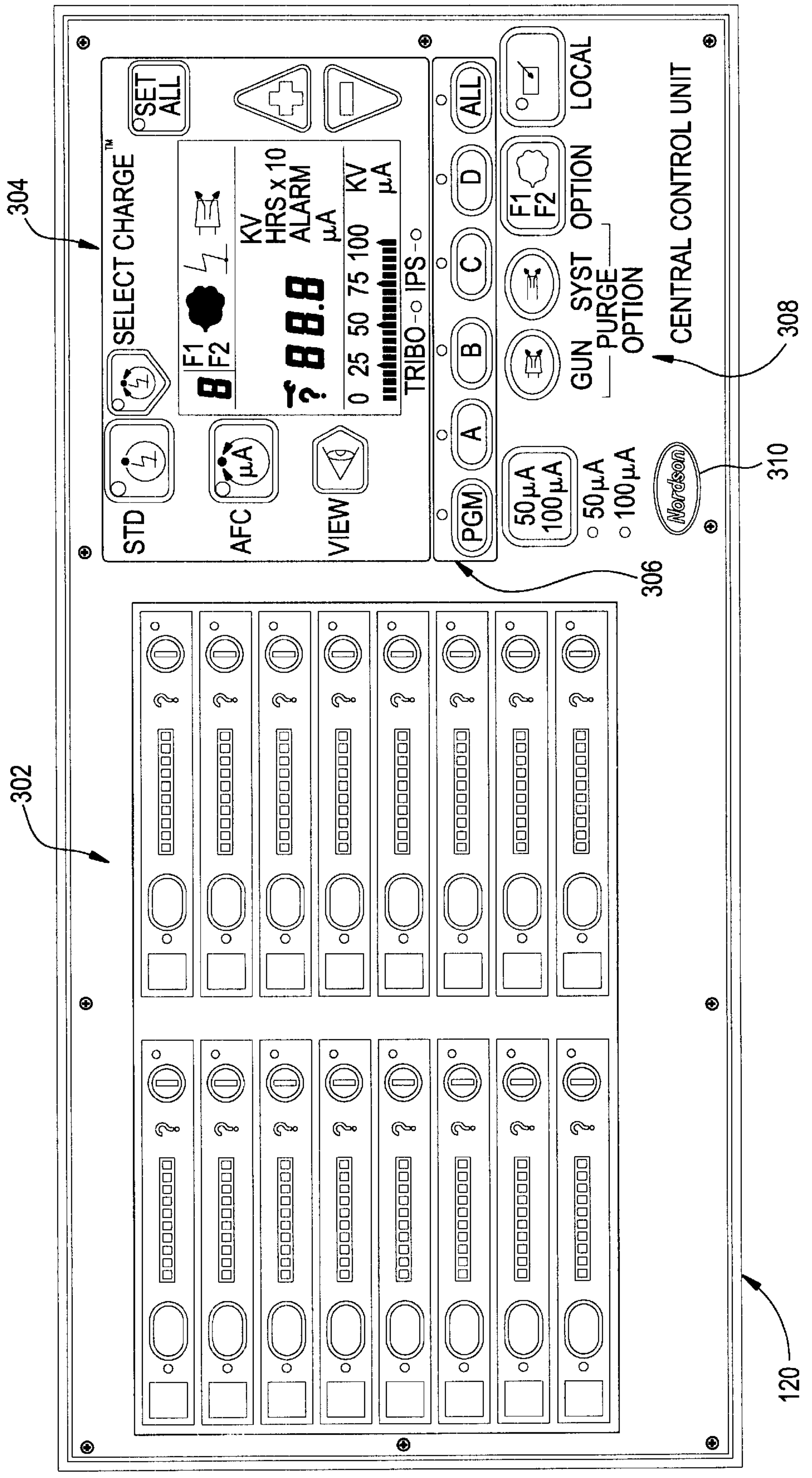
FIGS. 3, 4, 5, and 6 are diagrams illustrating the front face of an operator control panel of the present invention.

Referring now to FIG. 3, the front face of operator control panel 120 is illustrated. The front face includes a gun control area 302, electrostatics control/display area 304, manual trigger area 306, and system functions area 308. Thus, areas 304, 306 and 308 of control panel 120 comprise essentially a master control panel that is shared by each of the guns. Moreover, each of the guns has a gun or logic control 402–432 (shown in FIG. 4) that is essentially a gun control sub panel. A selector is provided for selecting at any given time which of the guns in the system is to be controlled or monitored by the master control panel areas 304, 306, 308. In the preferred embodiment, the selector is a button 434 that is located on each gun or logic control 402–432. By allowing each of the gun or logic controls to share the master control panel areas, the control panel space required for all the control functions of the guns is reduced. Moreover, by providing each of the gun or logic controls with a display, the gun or logic controls can be formed into a tight cluster so that displays representing each gun in the system can be conveniently viewed to spot any guns that are not performing properly.

Figure 4:
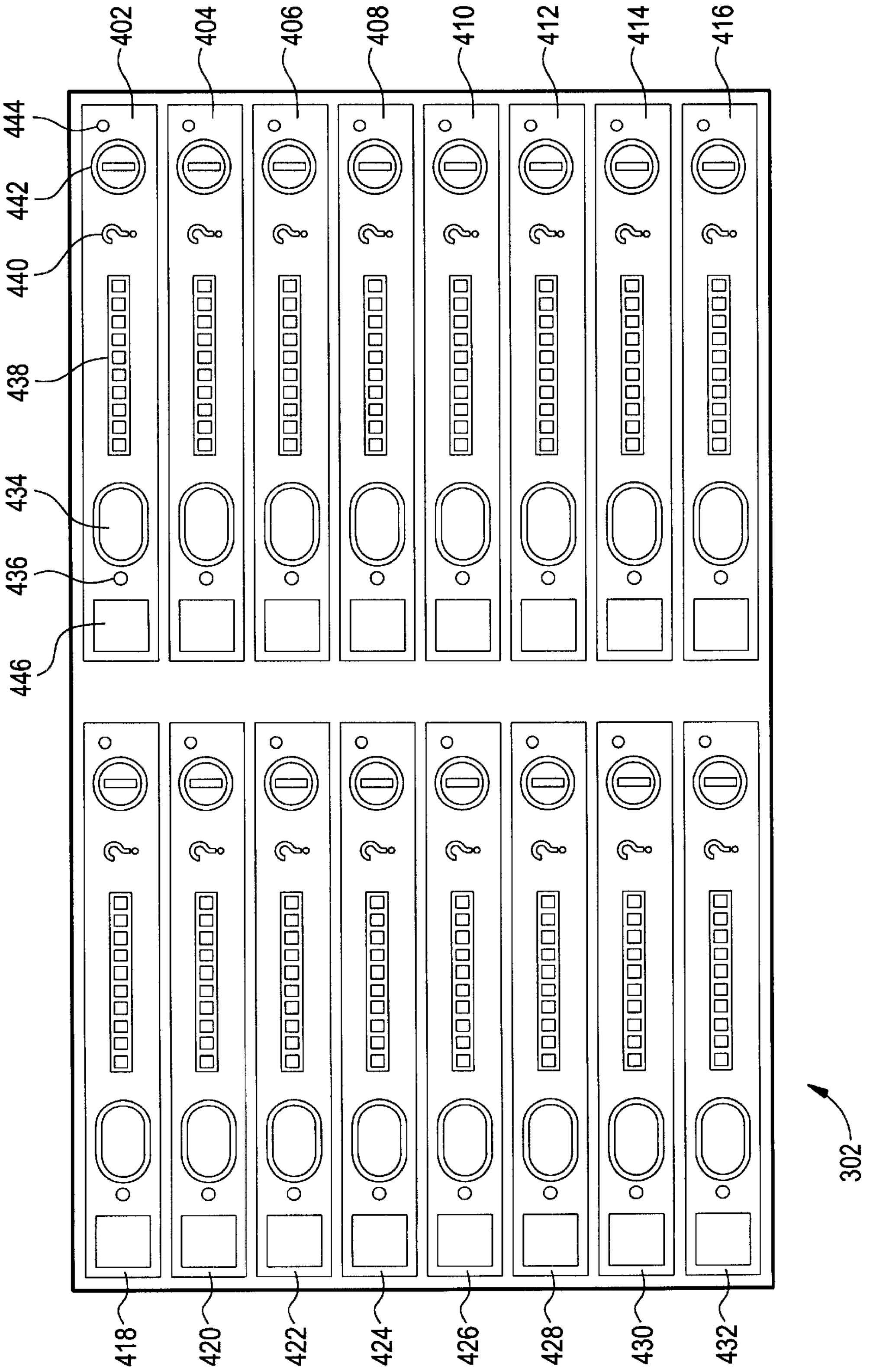

Referring now to FIG. 4, the gun control area 302 preferably includes a plurality of gun or logic controls 402 through 432. The gun or logic controls 402 through 432 are identical, except that they are assigned to individual spray guns. Hence, the description hereinafter will focus on the characteristics of gun control 402, with the understanding that such characteristics equally apply to gun controls 404 through 432.

More specifically, gun control 402 includes a display button 434, display LED 436, bar graph 438, fault indicator 440, trigger button 442, and trigger LED 444. When the display button 434 for a gun control 402–432 is pushed, the operating parameters for the gun associated with that gun control are monitored or controlled from the electrostatics control/display area 304. Area 304, together with areas 306 and 308, comprise essentially a single master control panel for the electrostatic parameters of all of the guns in the system. The gun or logic controls 400–432 comprise control subpanels for each of the guns. Depressing the display button 434 turns on the display LED 436 to indicate which gun or logic control 402 is active on the electrostatics control/display area 304. The display LED 436 preferably illuminates to a green color when the gun control is active. The bar graph 438 is preferably a ten segment bar graph that is used to display either kilo-voltage or micro-amperes. The bar graphs 438 for controls 402–432 are arranged in a tight cluster as shown in FIG. 4 to provide an easy way for the operator to scan all gun voltage or current levels from a centralized location and to spot any guns that are not performing properly. Fault indicator 440 is used to show that a fault condition exists in the spray gun or control. As shown, the fault indicator 440 is preferably in the form of a question mark ("?") that is illuminated to a red color when a fault condition exists. When a fault condition exists, an error code is displayed in the electrostatics control/display area 304 when button 310 (see FIG. 3) is pushed to initiate the system's diagnostic routines. The trigger button 442 is used to manually trigger a single gun or logic control on and off. The trigger LED 444 is illuminated to a yellow color when the gun associated with the gun or logic control is triggered. The gun control 402 also includes a gun ID area 446. Gun ID area 446 supplies a surface onto which numbers may be displayed via, for example, adhesive labels, that designate the gun number which is being controlled by the gun or logic control. Numbering or mapping of the guns is later described in more detail.

Figure 5:
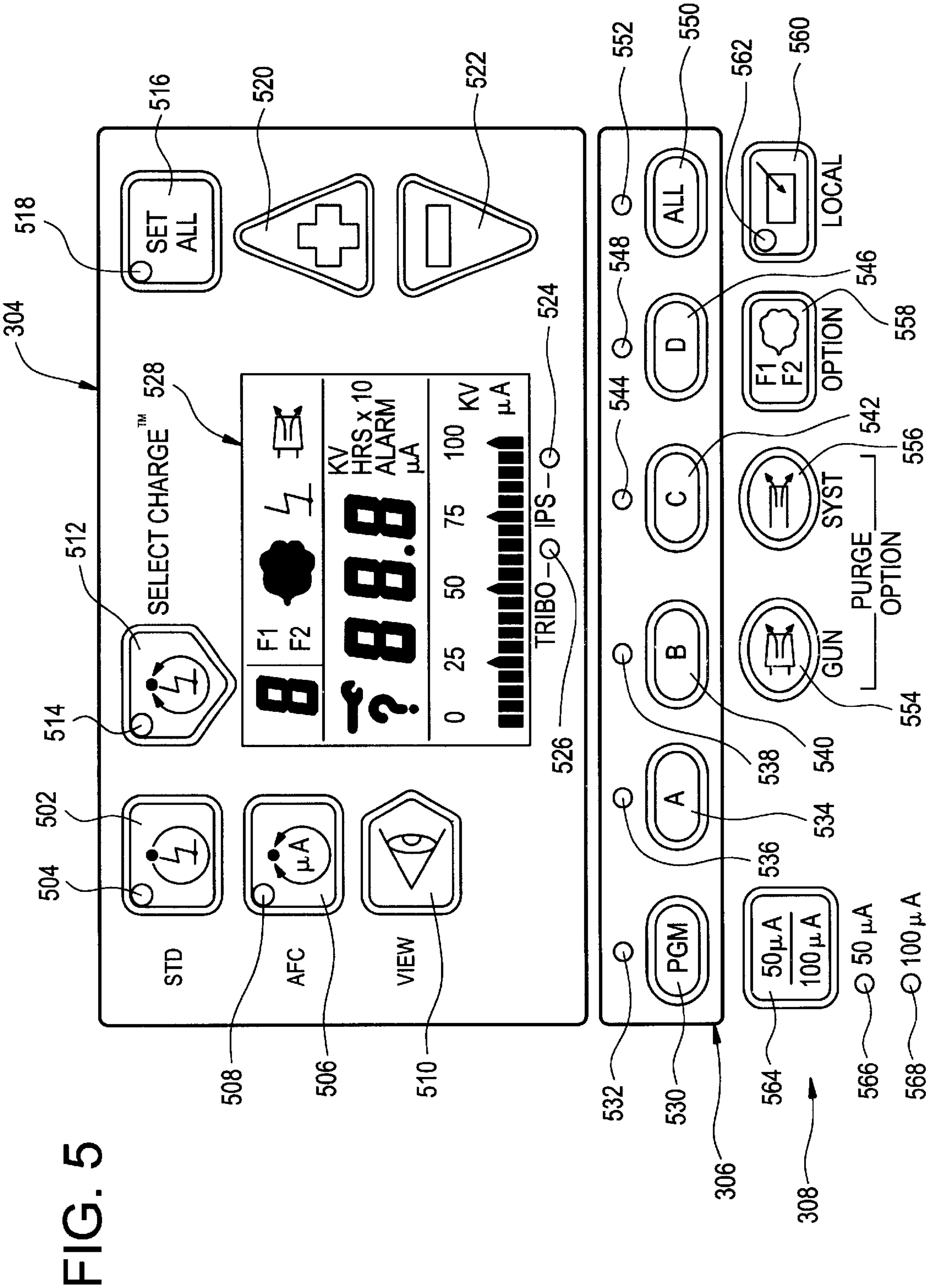

Referring now to FIG. 5, the electrostatics control/display area 304, manual trigger area 306, and the system functions area 308 are shown in detail. The electrostatics control/display area 304 includes a plurality of buttons, LEDs, and displays. More specifically, an STD button 502 is used to place the controller in the standard mode, as opposed to a "Select Charge Mode®." Select Charge is a trademark of Nordson Corp. and denotes a mode where different power supplies'load lines can be selected depending on the particular coating application. The Select Charge® System is described in U.S. Pat. No. 5,566,042 which is hereby incorporated by reference in its entirety. Pressing the STD button 502 displays a gun's charging voltage setting on display 528. Charging voltage is typically set between 40kv–100kv using increase or decrease buttons 520 and 522. A STD LED 504 illuminates to a green color when the electrostatic control/display area is in the STD mode. An AFC button 506 enables or disables an automatic feedback current mode. This mode can be either active or inactive in the standard mode. Depressing the AFC button 506 displays an automatic feed back current control mode on display 528. In the automatic feedback current mode, a gun's feedback current is set to maximum limit of 10 μA–100 μA for example using the increase or decrease buttons 520 and 522. During operation, if the feedback current limit is reached, the gun's power supply drive voltage is automatically reduced to drop the feedback current below the set limit. The automatic feedback current threshold is displayed in microamperes on display 528 when active. Additionally, an AFC LED 508 illuminates to a yellow color when the AFC mode is active. A view button 510 allows for the selection of different gun operating parameters on display 528 such as charging voltage in kilovolts, feedback current in microamperes, gun hours, and minimum feed back current alarm set point for tribo guns, for the gun that is selected from gun control area 302.

A Select Charge button 512 operates to switch the spray gun controller between standard mode (STD) and Select Charge mode. A Select Charge LED 514 illuminates to a green color when the Select Charge mode is active. In the Select Charge mode, preferably three different coating modes, or power supply load lines, can be selected. A load line defines a spray gun's voltage vs. current characteristics. For example, a first mode utilizes a load line especially advantageous for re-coating parts that have already been cured, but require additional coating and curing. A second mode utilizes a load line suited for coating large parts with a mix of large sections and recessed or angled sections. A third mode utilizes a load line suited for coating parts with deep cavities.

A Set All button 516 allows the operator to set all of the spray guns at once to the same parameter values. A Set All LED 518 illuminates to a yellow color when the Set All mode is active. An IPS LED is provided to indicate when a corona charging integral power supply spray gun is connected which is being displayed on display 528. A tribo LED is provided to indicate when a tribo gun is connected to the gun control that is being displayed on the display 528.

The manual trigger area 306 also includes a plurality of buttons and LEDs. More specifically, a PGM button 530 allows an operator to program various triggering groups. A triggering group is a group of spray guns that the operator would like to trigger on/off at the same time. Any given gun can belong to one or more groups. A PGM LED 532 illuminates to a red color when the controller is in the group trigger programming mode. The Group A button 534 when pressed triggers all of the spray guns on that are within the defined Group A. When the Group A button 534 is pressed again it toggles the control and turns off all the guns associated with group A. Similarly, Group B, C, and D buttons 540, 542, and 546, each respectively trigger all of the guns associated with their respective groups. Also as described above, a second depression of the group button toggles the control and turns off all the guns belonging to the group associated with the particular group button depressed. A plurality of LEDs such as, for example Group A LED 536, Group B LED 538, Group C LED 544, and Group D LED 548, illuminate to a green color when each of their respective spray gun groups is active. A group ALL button 550 triggers all of the guns. Pressing the group ALL button 550 a second time toggles the control and turns off all of the guns. A group ALL LED 552 illuminates to a green color when the group ALL is the active spraying group. The way in which guns are assigned to a group is later described in more detail. The gun grouping feature is particularly useful if an operator wanted to trigger less than all the guns in the booth such as when a small part is to be coated in the booth. In that case, the operator would put into Group A the group of guns directed at the area of the booth that the small part would pass through. As the part approached the guns, the operator would push the Group A button to trigger the Group A guns on. Once the part has passed the Group A guns, the operator would push the Group A button again to trigger the guns off.

The system functions area 308 also includes a plurality of buttons and displays. More specifically, a F1/F2 button 558 toggles between a first and a second pneumatic operational mode. The difference between the first and second pneumatic operational mode is preferably a difference of air flow rates that are supplied to the pump that is feeding the gun whose gun control is active on display 528. With reference to FIG. 11, which will later be described in more detail, two stacks of pneumatic regulator panels are shown under operator electrostatic control panel 120. On the left is a stack of two gauge regulator panels 1102, and on the right is a stack of three gauge regulator panels 1104. Each of the two gauge regulator panels 1102 has an atomizer air regulator and gauge and a flow air regulator and gauge, which control a pump connected to one of the spray guns. The spray gun is controlled by one of the gun or logic controls 402–432. Likewise, each of the three gauge regulator panels 1104 has one atomizing air regulator and gauge, and two flow air regulators and gauges to control a pump connected to one of the spray guns. Again, the gun is controlled by one of the gun or logic controls 402–432. One of the flow regulator's of the three gauge panel 1104 can be set to a first powder flow rate (F1) and the other flow regulator can be set to a second powder flow rate (F2). The button 558 is used to select either the flow rate F1 or the flow rate F2 to for the pump supplying powder to the gun being controlled by the control that is active on display 528. Typically, the controller would have all two gauge panels or all three gauge panels. These pneumatic panels contain only pneumatic controls for the guns since all controls relating to the electrostatics for the guns are in the gun or logic controls 402–432 or master control panel areas 304, 306, 308. A gun purge button 554 activates a gun purge function. This function cleans the powder in the spray gun powder path and remains on as long as the gun purge button 554 is pressed. A system purge button 556 activates a system clean purge function. In one embodiment, this function activates two air solenoids. A first solenoid pulses air to the spray guns and associated pumps. A second solenoid provides a continuous supply of air to block powder flow from entering into the pump. A local/remote button 560 permits the operator control panel 120 to be controlled by a remote programmable logic controller (PLC) instead of locally by an operator at the booth. Thus, if the button 560 is pushed to put the control panel 120 in remote mode, the control panel can be operated remotely by a PLC in the same way as it would be operated locally by an operator standing at the control panel 120. In the FIG. 11 embodiment of this invention, the PLC is mounted on top of control panel 120. Therefore, if button 560 is pushed the control panel 120 will be controlled automatically by PLC 1110 rather than manually by the buttons on control panel 120. Consequently, the term "remote" denotes automatic control of control panel 120, whereas the term "local" denotes manual control of the control panel 120. Note also that whereas PLC 1110 and control panel 120 are shown on the top of the controller stack in the embodiment shown in FIG. 11, either the control panel 120 or PLC 1110, or both, could be taken off of the top of the stack and placed at another location which is more convenient for the user. A local/remote LED 562 illuminates to a yellow color when the system is in the local operational mode. A bar graph scale button 564 toggles between a 50 micro-amperes full scale and a 100 micro-amperes full scale display reading for corona guns. For tribo guns, button 564 toggles between a 10 microamp full-scale and 20 microamp full-scale display reading. Thus, in systems function area 308, the markings "50 microamps" and "100 microamp" could be changed, for example, to "Low Current" and "High Current" respectively to allow for the difference in scale readings between tribo guns and corona guns. Two LEDs 566 and 568 are also provided that illuminate to a green color when their respective set points are operational.

Figure 6:
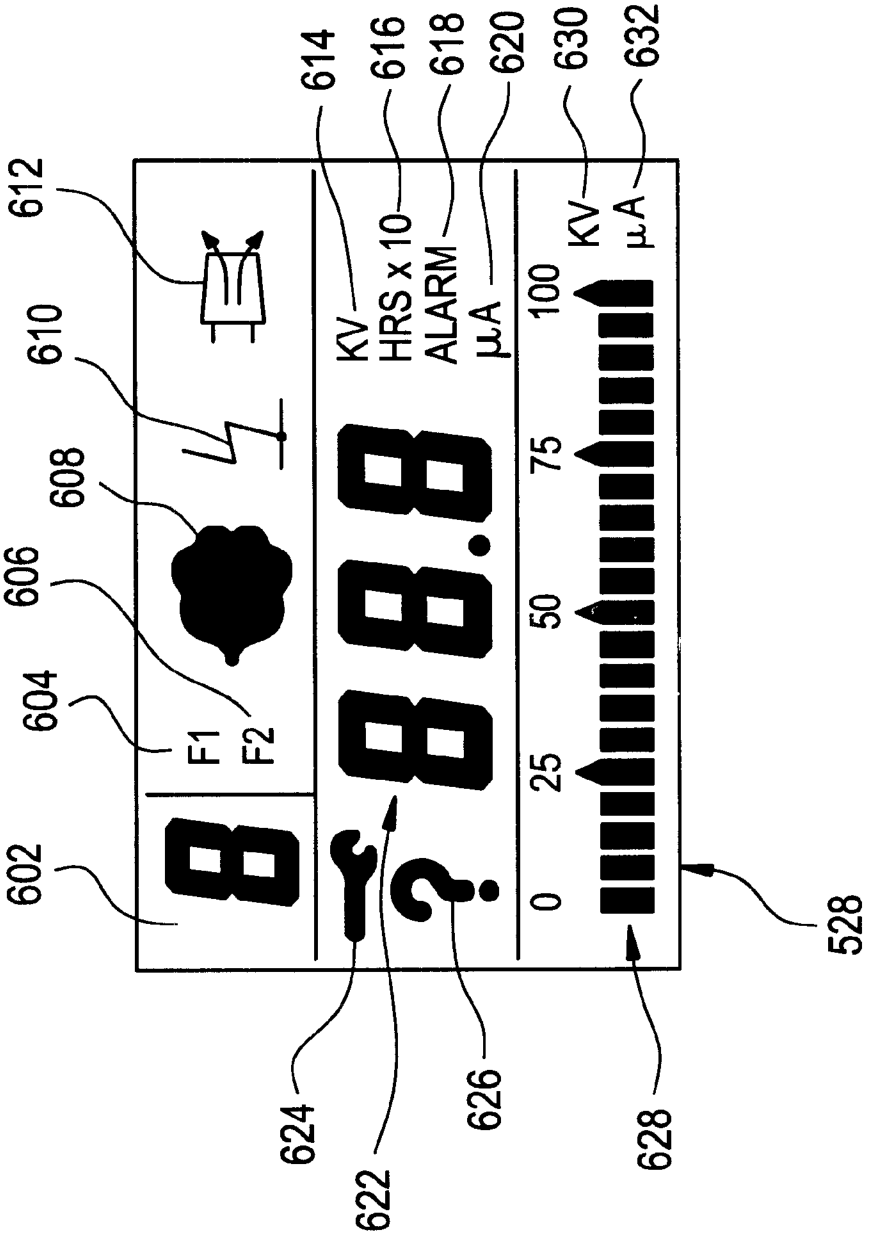

Referring now to FIG. 6, a more detailed discussion of display 528 will now be presented. In particular, a select charge value indicator 602 indicates a number that corresponds to one of the three load lines described above (e.g. 1, 2, or 3). In other embodiments, more than three load lines could be loaded into the system and selected. First and second flow rate regulator indicators 604 and 606 indicate whether the F1 or F2 flow rate has been selected. A powder icon 608 indicates that the spray gun whose control is active on display 528 has been triggered and powder is being sprayed from the gun. A gun kilo-voltage icon 610 indicates that the spray gun being monitored is triggered. The gun kilo-voltage icon 610 will flash if a fault in the gun's power supply is detected. A purge operation icon 612 indicates when the gun being monitored is undergoing purge operations triggered by button 554. A digital display 622 shows a digital number representing the various operating parameters being sent and monitored such as, for example, kilo-voltage and micro-amperes, selected for display. Examples of additional information that may be displayed are gun operating hours, error codes, software version, kilo-voltage set point, gun micro-ampere set point, and the gun micro-ampere actual value. The display is preferably blank when no appropriate value can be displayed. A plurality of unit indicators 614, 616, 618, and 620 illuminate to indicate the selection of kilo-voltage, micro-amperes, gun hours, times ten multiplication factor, and alarm. A bar graph display 628 shows the kilo-volt or micro-ampere parameter displayed on the digital display 622 as a bar graph. Bar graph current or voltage unit indicators 630 and 632 are displayed as appropriate. A diagnostics icon 624 indicates when the controller is in the diagnostics mode. A fault icon 626 indicates when there is an alarm or error condition. When the fault icon 626 is displayed, button 310 (FIG. 3) is pushed to initiate the diagnostics routines that identify the error.

Referring now to FIGS. 1 through 6 in general, an overview of the system operation will now be presented. Upon power up, the operator control panel 120 receives a status message from the I/O cards connected to I/O port 122. The operator control panel 120 identifies the number of guns connected to the system. The operator control panel 120 will then assign appropriate gun or logic controls 402 through 432 to the number of guns attached to the controller. The basis of this assignment scheme is either a default or custom gun mapping configuration. More specifically, I/O port 122 includes a plurality of I/O cards. Each I/O card occupies a predetermined I/O slot (e.g., slot 0, 1, 2, 3, etc.) which determines the I/O card's logical index (e.g., 0, 1, 2, 3, etc.) A spray gun connected to I/O card 0 is generally denoted as spray gun 1 and etc. As will be described below, the present invention permits a particular gun mapping scheme to be changed for operator convenience, or otherwise.

When the control panel 120 receives a status message from the I/O cards connected to the I/O port 122, as a part of that message the control 120 receives information identifying the type of gun as a corona gun or a tribo gun. This information is stored on the I/O card for the gun. Control 120 illuminates LED 524 for a corona gun and LED 526 for a tribo gun when the selected gun or logic control 402–432 is active on display 528.

For corona-charging guns, bar graph 438 shows in real time the kilo-voltage or micro-ampere bar graph readings for that gun. Whether a voltage or current reading is shown is determined by view button 510. When button 510 is pushed to select either kilo-volts or micro-amperes for the gun control which is active on display 528, that selection not only controls display 528 but also controls the displays 438 of all of the gun controls 402–432. If button 510 has selected current, then the bar graphs 438 show current levels such as, for example, the power supply feedback current levels for all the guns. If button 510 has selected voltage, then bar graphs 438 display voltage levels such as, for example, the charging voltage levels for all of the spray guns. In this way, the electrostatic characteristics of all the guns can be compared as a group to spot any guns which are not performing properly.

To show a particular corona-charging gun's operating data or to change the gun's electrostatic settings, the operator must first press the display button 434 next to the gun number desired. The corona-charging gun's settings and parameters may now be appropriately changed as already described.

For tribo guns, bar graph 438 for each gun shows in real-time the feedback current for that gun. As with the corona guns, the ability to simultaneously view the displays 438 of all the gun or logic controls 402–432 for all the tribo guns in the system is very helpful to the operator and allows the operator to easily compare the guns to one another and spot any guns which are not performing properly. To show a particular tribo gun's operating parameters or to change the gun's parameters, the operator must press the display button 434 next to the gun number desired in gun control area 302.

In regards to the tribo gun alarm set point, correct operation of a tribo gun depends on a constant current flow from the spray gun. By monitoring the micro-ampere ground current feedback from a tribo gun, it can be determined if the gun is operating properly. The tribo alarm set point is a programmable minimum ground current parameter that an operator uses to determine whether the tribo gun is operating within acceptable limits. The operator sets the tribo alarm set point to a value and if the feedback current drops below the set point, the fault indicator 440 will illuminate indicating an error condition.

The Set All function is initiated by Set All button 516 and allows the operator to program the electrostatic parameters for all of the guns connected to the controller at the same time. Depressing the Set All button 516 turns on Set All LED 518 and all of the display LEDs 436 in gun control area 302. When the changes are complete, depressing the Set All button 516 a second time will put the system in the normal operational state with the new settings. For mixed gun systems, (i.e., systems having both corona and tribo guns) when the Set All button 516 is depressed, the Set All function sets the parameter being adjusted for all guns of the type which is currently active on display 528. Thus, if a corona type is active on display 528, the Set All function sets the parameter that is being adjusted for all corona guns in the system.

Group programming allows the operator to set up triggering groups. There are four triggering groups that can be programmed on the operator control panel 120 (e.g., Groups A, B, C, and D). Guns belonging to a particular group can be triggered on and off at the same time. Additionally, a particular gun can belong to more than one group. To program a group, the program button PGM 530 is pressed causing LED 532 to illuminate to a yellow color. Next, the group desired to be programmed is selected via one of Group A button 534, Group B button 540, Group C button 542, or Group D button 546. With the program and group functions selected, the operator now presses the trigger button 442 of the gun or logic controls associated with each gun that the operator wants to belong to that group. The trigger LED 444 of each selected gun control is illuminated to indicate that that particular gun is part of the selected group. If the operator would like to remove a gun from a particular group, the trigger button of the associated gun or logic control to be removed is pressed and the trigger LED 444 for that gun control will turn off. The operator can program the next group by simply depressing the appropriate group button (i.e., 534, 540, 542, or 546) that is to be programmed next. After all of the groups are programmed, the operator can exit the program mode by depressing the program button PGM 530 a second time.

Figure 12:
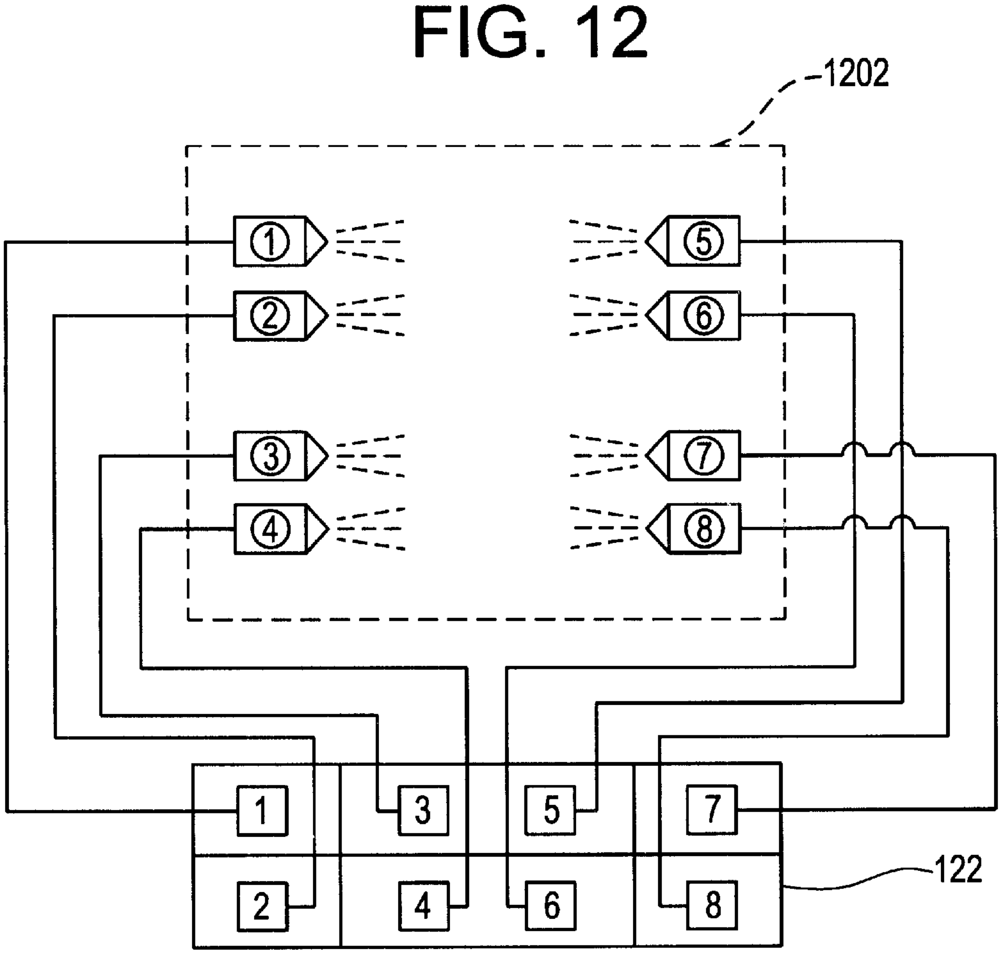
FIG. 12 is a block diagram illustrating multiple gun connections to an input/output port of the spray gun controller of the present invention.
Figure 13B:
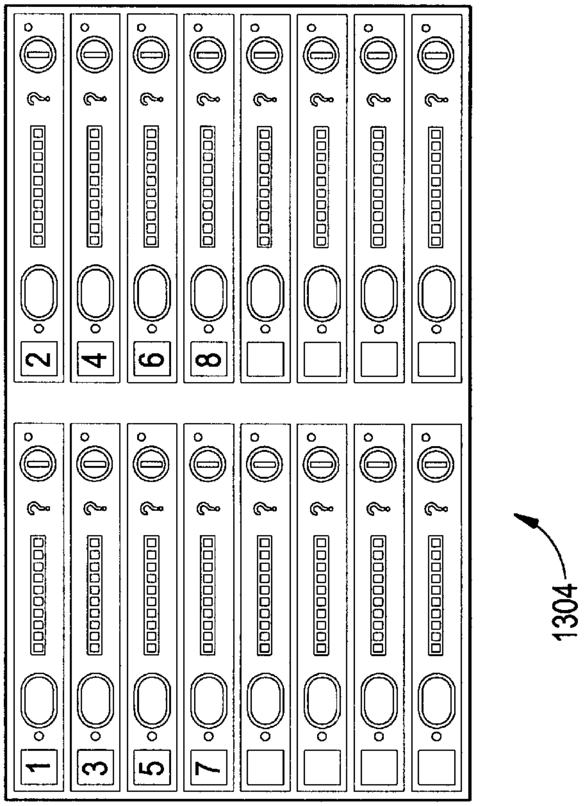
FIGS. 13A and 13B are illustrations of alternative embodiments of the physical mapping of the spray gun configuration of FIG. 12 onto the front face of the operator control panel of the present invention.
Figure 13A:
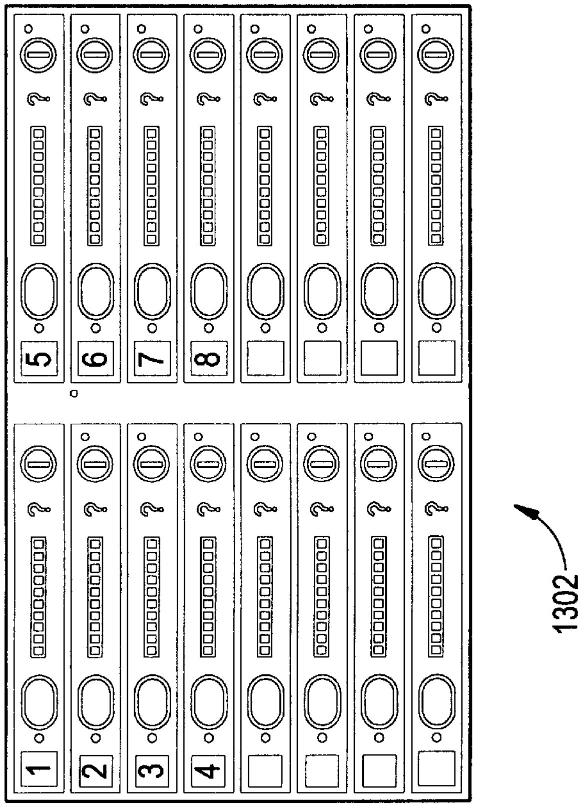

Referring now to FIGS. 12 and 13A–13B, the physical-to-logical gun mapping aspect of the present invention will now be described. In particular, FIG. 12 shows a spray booth 1202 with spray guns 1–8. The spray guns 1–8 are in circuit communication with I/O port 122 of controller 106. The I/O port includes a plurality of I/O cards similarly numbered 1–8. As shown, each spray gun is represented by the I/O card to which it is connected. For example, spray gun 1 is connected to I/O card 1. Spray gun 2 is connected to I/O card 2, and so on.

Illustrated in FIGS. 13A and 13B are two embodiments 1302 and 1304 of how the spray guns may be mapped to the front face of operator control panel 120. Other embodiments are possible. The purpose of the physical-to-logical gun mapping of the present invention is to allow an operator to mirror the physical spray gun configuration on the operator interface panel 120, as most logical to the operator. Thus, the user may chose to map the gun numbers as shown in FIG. 13A to correspond to the physical location of the guns in the spray booth. This facilitates physical recognition of spray gun locations based on their logical mapping on the front of the operator control panel 120 and, more specifically, on the gun control area 302.

The physical-to-logical gun mapping configuration/review precedure of the present invention will now be described with reference to FIGS. 3, 4, and 5. The procedure is initiated by holding down the "Nordson" button 310 during the power-up sequence. The power-up sequence is initiated by switching to the "on" position of the on/off power switch (not shown) that is provided on the back of central control panel 120. This causes the LCD display 528 to display "CFG" in display area 622 until button 310 is release, and then a number "1" is displayed in the display area 622, which in this mode represents the physical address of spray gun 1. The increase and decrease buttons 520 and 522 are used to scroll through the physical gun addresses (e.g., 1–16). As each physical gun address is displayed, its corresponding (if any) gun or logic control is indicated in gun control area 302 through illumination of the display LED 436 on the appropriate gun or logic control 402–436.

To change gun mapping, the increase or decrease buttons 520 and 522 (shown in FIG. 5) are used to scroll to a physical gun address that is to be changed. Once the physical gun address is chosen, the display button (e.g., button 434 shown in FIG. 4), is pressed on the desired gun or logic control (e.g., 402–432) to map a gun thereto. Guns can be unmapped by the same procedure. Any gun can be mapped to any gun or logic control 402–432. However, two guns cannot be mapped to the same gun or logic control.

As will be described in more detail, the gun mapping of the present invention uses at least one and preferably two tables to maintain correspondence between gun physical addresses and gun or logic controls. A first table is a logical table that maintains logical-to-physical correspondences and a second table is a physical table that maintains physical-to-logical correspondences. The use of these tables will now be described in more detail.

Figure 7A:
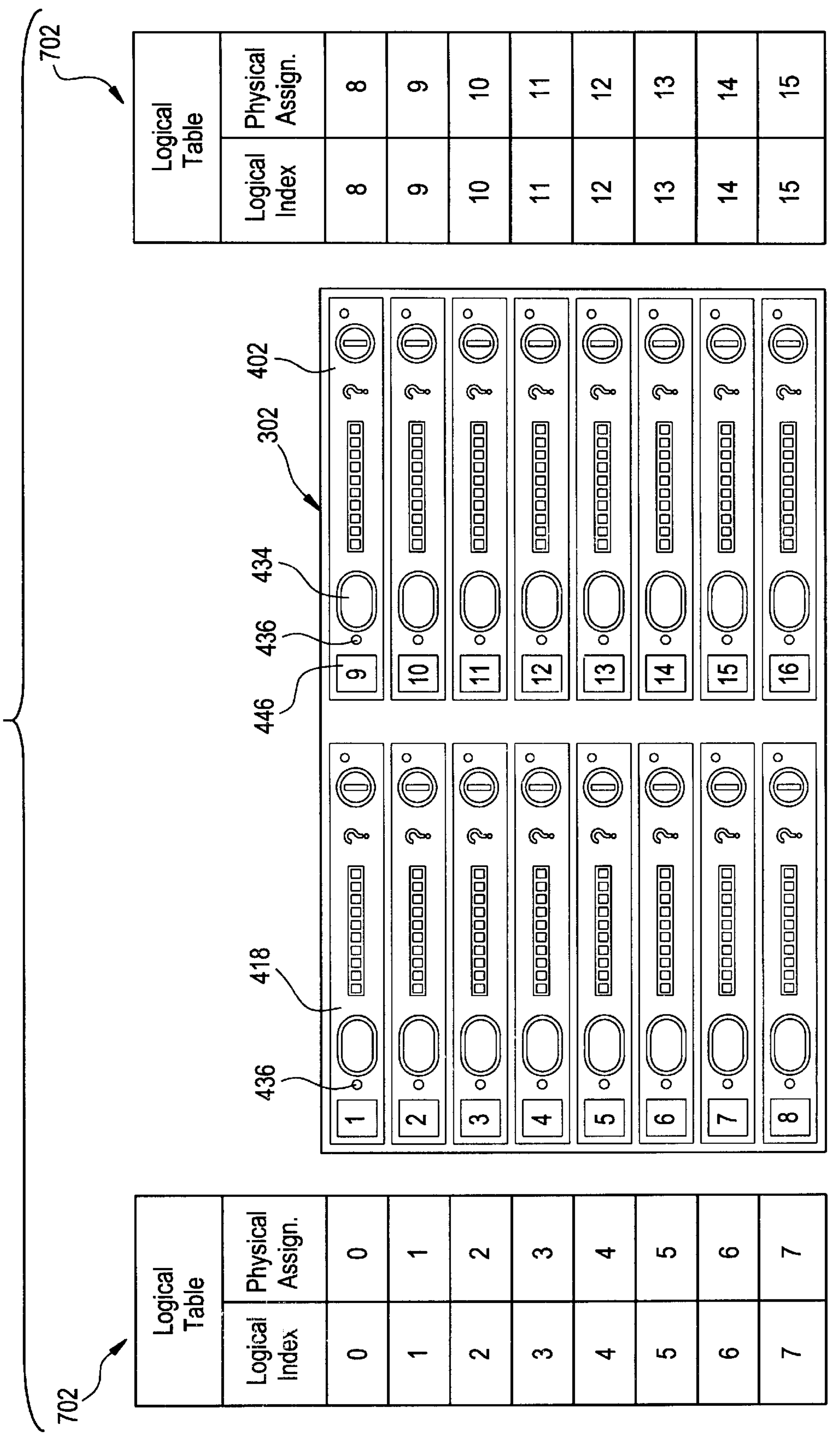
FIGS. 7A, 8A, 9A, and 10A illustrate various gun mapping configurations of the present invention with, among other things, logical-to-physical tables.
Figure 8A:
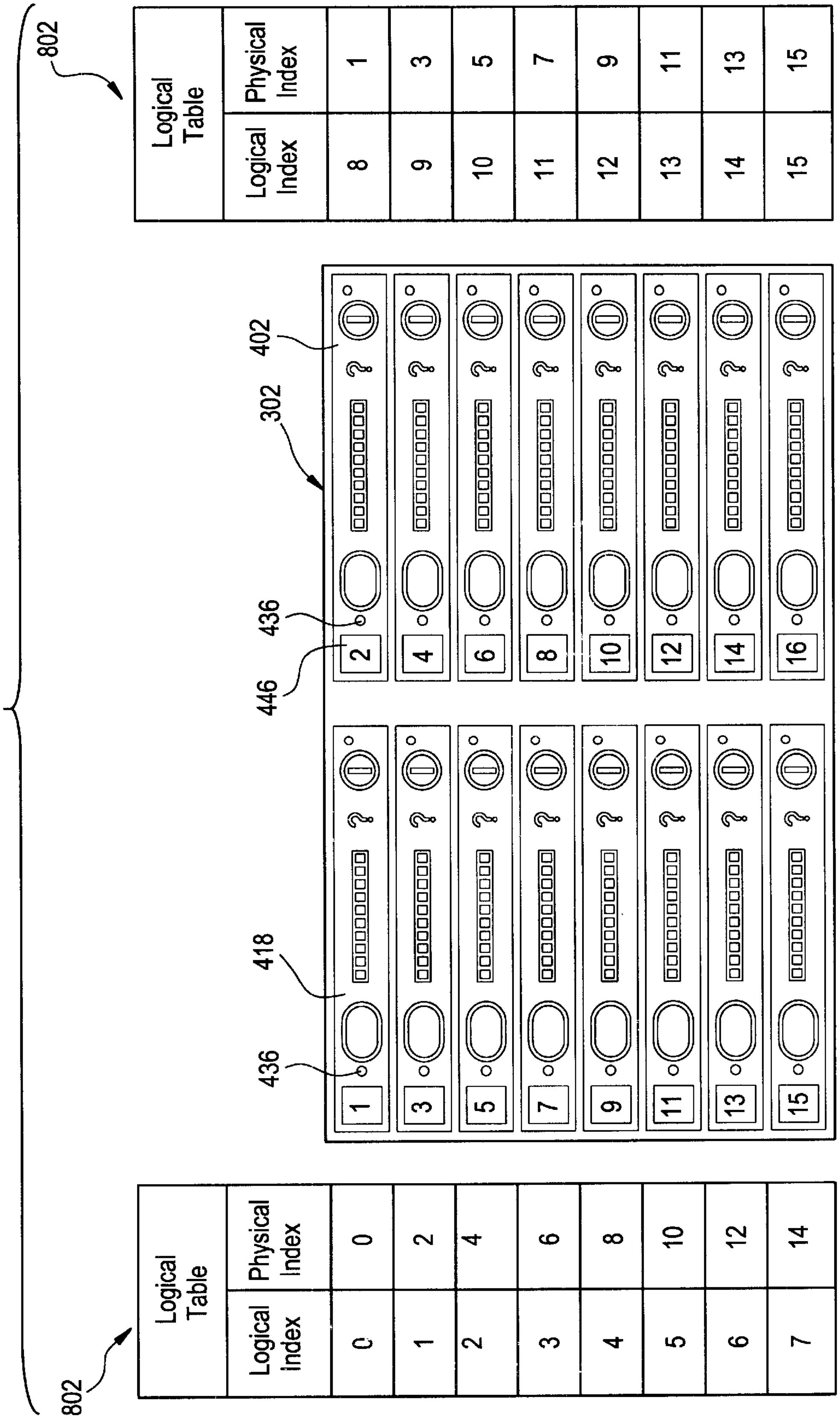

Referring now to FIG. 7A, one embodiment of a default gun mapping scheme is shown with a corresponding logical table 702. Logical table 702 includes a Logical Index field and a corresponding Physical Assignment field. Logical Index values are associated with a particular gun or logic control (e.g., 402–432) in the gun control area 302. Hence, logical table 702 as shown is split in sections so that the Logical Index field is shown proximate its associated gun or logic control. For example, the Logical Index of zero (0) is shown near its gun or logic control 418. Similarly, the Logical Index of 8 is shown near its gun or logic control 402. The remaining Logical Indexes are similarly shown. The number of Logical Index entries generally equals the number of gun or logic controls in the system. In the embodiment of FIG. 7A, there are sixteen gun or logic controls, which correspond to sixteen entries (i.e., 0 to 15) in the Logical Index field. The Physical Assignment field holds the Physical address minus 1 of the gun being controlled by the gun or logic control. For example, gun or logic control 418 has a Logic Index of zero (0) and controls a gun having a Physical Address=1, which corresponds to a Physical Assignment=0). Similarly, gun or logic control 402 has a Logic Index of 8 and controls a gun having a Physical Address=9, which corresponds to a Physical Assignment=8). Since the gun number usually corresponds to the gun physical address, that number is typically printed or marked in each gun ID area such as, for example, gun ID area 446 of gun or logic control 402. FIG. 8A shows a second embodiment of a default gun mapping scheme of the present invention with its corresponding logical table 802.

FIGS. 7B and 8B show the corresponding physical tables 704 and 804 for the gun mapping schemes of FIGS. 7A and 8A, respectively. Each physical table 704 and 804 includes a Physical Index field and a Logical Assignment field. The Physical Index field generally corresponds to the Physical Assignment field already discussed. Namely, the Physical Index field is a gun's Physical Address minus 1. The Logical Assignment field generally corresponds to the discussed Logical Index field.

Figure 9A:
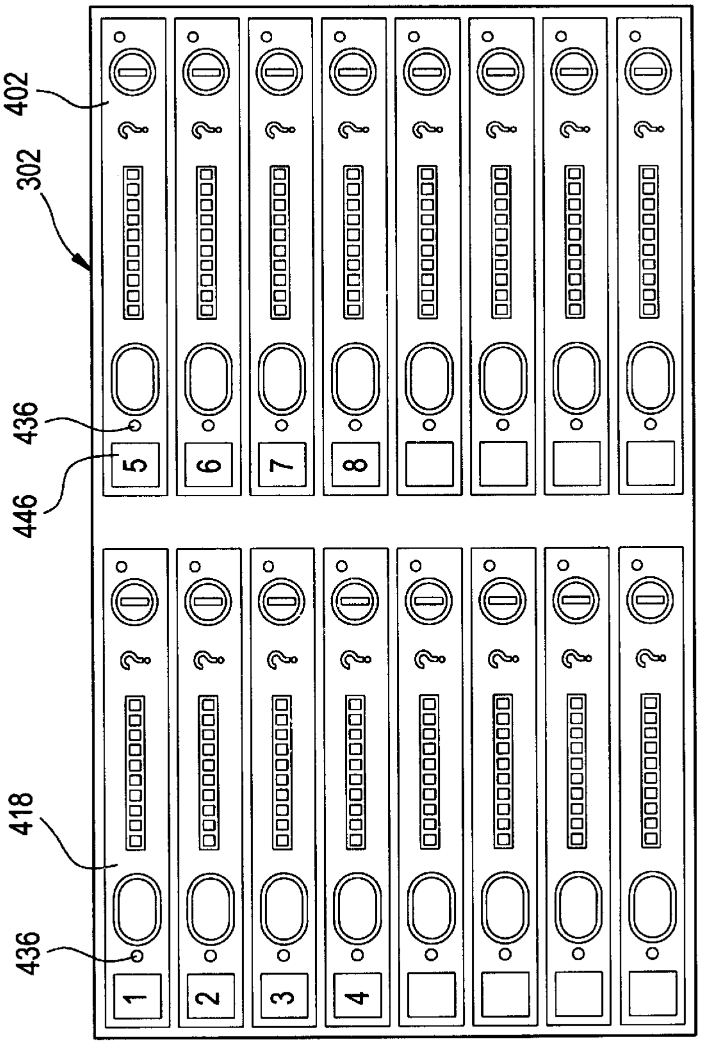

Referring to FIG. 9A, the discussion will now focus on how unmapped guns are handled by the present invention. In the scenario of an unmapped gun, a value of 16 is entered into the logical table and physical table in the appropriate field. For example, gun or logic controls that do not have a gun mapped to them have a corresponding Physical Assignment of 16. In logical table 902 of FIG. 9A, Logical Indexes 4–7 and 12–15 have Physical Assignments of 16—meaning those gun or logic controls do not have guns mapped thereto. FIG. 9B illustrates the corresponding physical table 904. More specifically, physical table 904 shows how the field value of 16 is used to denote a physical gun that is not mapped to a logical assignment (i.e., gun or logic control unit). In accord with the gun mapping of FIG. 9A, physical table 904 shows that Physical Indexes 8–15 (i.e., physical guns 9–16) are not mapped to any gun or logic control units by use of the field value 16 in the corresponding Logical Assignment field.

Figure 10A:
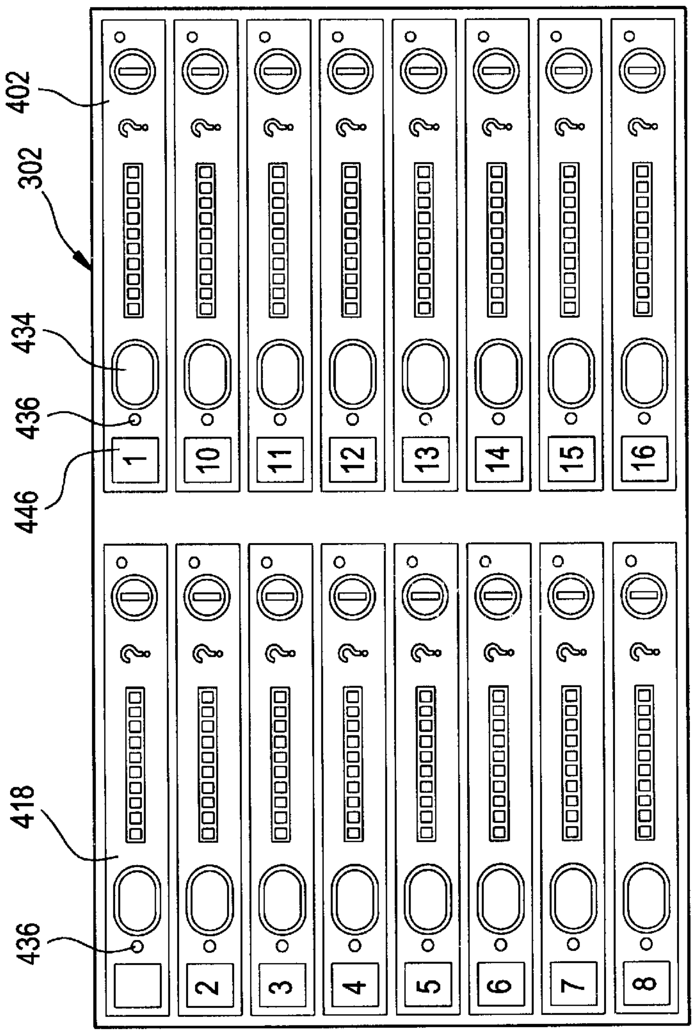

Referring now to FIGS. 7A and 10A, a discussion of how to change the default gun mapping of FIG. 7A to the gun mapping of 10A will be presented. More specifically, physical gun address 1 (i.e., gun physical assignment or index=0) will be mapped from gun or logic control unit 0 to unit 9. The mapping typically starts by selecting physical gun address 1 on LCD display 528 by using the increase and decrease buttons 520 and 522 (shown in FIG. 5) during the configuration procedure. Once selected, the gun's logic control unit in gun control area 302 is indicated through illumination of the control's display LED. In this example, the display LED 436 of gun or logic control 418 of FIG. 7A is illuminated. Gun or logic control 418 represents a Logical Index value of zero (0) and physical gun address 1 corresponds to gun Physical Assignment of zero (0), as shown in logical table 702. The operator now presses the display button 434 of gun or logic control 402, which has a Logical Index of 9.

This mapping causes several changes to occur in the tables of the present invention. In particular, because two guns cannot occupy the same gun or logic control, physical gun 9 (i.e., physical assignment or index =8) becomes unmapped. Consequently, in physical table 1004 of FIG. 10B, the field value of 16 is written to the Logical Assignment field of Physical Index=8. Still referring to the physical gun table of FIG. 10B, the new assignment is made by writing gun or logic control 9 (i.e., Logical Assignment=8) in the Physical Index= zero (0) Logical Assignment field. Physical gun address 1 is now mapped to gun or logical control 9. As shown in logical table 1002, logical control 1 (i.e., Logical Index=0) has no gun assignment (i.e., Physical Assignment=16) and as shown in physical table 1004, physical gun 9 (i.e., Physical Index=8) has no Logical Assignment (i.e., Logical Assignment=16.)

Through the described mapping configuration, gun data (e.g., type, operation, etc.) is logged in a data table (not shown). When a gun's data is being updated such as, for example, for displaying, each gun or logic control is updated by accessing the physical (i.e. physical-to-logical) table of the present invention. The status from a physical location is written to the proper gun or logic control based on the physical table. When an operator presses a key on one of the gun or logic controllers, the logical (i.e. logical-to-physical) table of present invention is used to read and determine the physical gun location of the gun or logic controller. The controller is then sent the appropriate message or data. When either table is accessed and a value of 16 is retrieved, a key press or display update is ignored, disabling that gun or logic controller. Maintaining two separate tables in this manner is not necessary. On table could suffice. However, having two tables cross-referenced in this manner allows the update software to execute much more efficiently. Table generation is preferably done once during configuration and then stored in a serial electrically erasable programmable read only memory (EEPROM) in the central control 120.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the functional configuration of the gun control area may be re-arranged and the colors of displays and LEDs may modified. Additionally, information beyond the operating parameters and spray gun type identification can be displayed such as, for example, test facility, test operator, date of gun manufacture, maintenance intervals, etc. Moreover, while the invention has been described with respect to the spray guns of a powder coating system, the invention would be equally applicable to a coating system having liquid coating material applicators. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A coating system having a plurality of spray guns and a controller for the spray guns, the controller comprising a master control panel and a selector for selecting one of said guns to be controlled or monitored by the master control panel, wherein each gun has a gun control subpanel, and wherein each gun control subpanel includes a selector device for selecting that gun as the gun to be monitored or controlled by the master control panel.

2. A coating system having a plurality of spray guns and a controller for the spray guns, the controller comprising a master control panel and a selector for selecting one of said guns to be controlled or monitored by the master control panel, wherein each gun has a gun control subpanel, and wherein each gun control subpanel has a display for displaying electrical characteristics of the gun associated with the control panel.

3. A coating system having a plurality of spray guns and a controller for the spray guns, the controller comprising a master control panel and a selector for selecting one of said guns to be controlled or monitored by the master control panel, wherein each gun has a gun control subpanel, wherein each gun control subpanel has a display for displaying electrical characteristics of the gun associated with the control panel, and wherein the gun control subpanels are located adjacent one another so that the electrical characteristics of the guns associated with the gun control subpanels can be viewed together.

4. The coating system of claim 3, wherein the gun control subpanels are located adjacent to the master control panel.

5. The coating system of claim 1 wherein each gun control subpanel further includes a LED bar graph display for displaying the electrical characteristics of the gun controlled.

6. The coating system of claim 1 wherein each gun control subpanel further comprises a fault indicator for the gun controlled.

7. The coating system of claim 1 wherein the master control panel further includes an alpha-numeric electronic display for displaying pneumatic and electric operating parameters of the gun controlled.

8. The coating system of claim 1 wherein the master control panel further includes an automatic feedback current mode of operation selector.

9. The coating system of claim 1 wherein the master control panel further includes a coating mode selector for selecting one of plurality of coating modes of operation for the gun controlled.

10. The coating system of claim 1 wherein the master control panel further includes a set manual triggering mode selector for one or more guns to be triggered manually from the master control panel.

11. The coating system of claim 1 wherein the master control panel further includes one or more group selector for selecting one or more predefined groups of guns for controlling their operation.

12. The coating system of claim 1 wherein the master control panel further includes a pneumatic operating mode selector for selecting between one of a plurality of pneumatic operating modes for one or more guns.

* * * * *